(12) United States Patent
Dickens et al.

(10) Patent No.: US 9,172,551 B2
(45) Date of Patent: **\*Oct. 27, 2015**

(54) RELIABLE MULTICAST WITH AUTOMATIC SESSION STARTUP AND CLIENT BACKFILL SUPPORT

(75) Inventors: Christopher Scott Dickens, Issaquah, WA (US); Asad Yaqoob, Redmond, WA (US); Saad Syed, Kirkland, WA (US); Jeremy Sadler, Seattle, WA (US); Alaa H. Abdelhalim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/198,621

(22) Filed: Aug. 4, 2011

(65) Prior Publication Data

US 2011/0286379 A1  Nov. 24, 2011

Related U.S. Application Data

(63) Continuation of application No. 11/823,143, filed on Jun. 27, 2007, now Pat. No. 8,018,933.

(51) Int. Cl.
*H04H 1/00* (2006.01)
*H04J 3/24* (2006.01)
*H04L 12/18* (2006.01)

(52) U.S. Cl.
CPC .................................. *H04L 12/185* (2013.01)

(58) Field of Classification Search
None
See application file for complete search history.

(56) References Cited

U.S. PATENT DOCUMENTS

| 5,805,825 | A |   | 9/1998  | Danneels et al. |
|-----------|---|---|---------|-----------------|
| 5,905,871 | A |   | 5/1999  | Buskens et al. |
| 6,049,878 | A |   | 4/2000  | Caronni et al. |
| 6,101,184 | A | * | 8/2000  | Tobe et al. ..................... 370/390 |
| 6,104,709 | A |   | 8/2000  | Rinchiuso et al. |
| 6,144,651 | A |   | 11/2000 | Rinchiuso et al. |
| 6,151,696 | A | * | 11/2000 | Miller et al. .................. 714/748 |
| 6,154,463 | A |   | 11/2000 | Aggarwal et al. |
| 6,256,673 | B1| * | 7/2001  | Gayman ....................... 709/232 |
| 6,269,080 | B1|   | 7/2001  | Kumar |
| 6,269,085 | B1|   | 7/2001  | Provino et al. |
| 6,385,647 | B1|   | 5/2002  | Willis et al. |
| 6,427,166 | B1|   | 7/2002  | Hurst et al. |

(Continued)

OTHER PUBLICATIONS

RFC 1301-Multicast Transport Protocol' S. Armstrong et al ; Feb. 1992; entire document; www.faqs.org/rfcs/rfcs1301.html.*

(Continued)

*Primary Examiner* — Hassan Phillips
*Assistant Examiner* — Prenell Jones
(74) *Attorney, Agent, or Firm* — Danielle-Johnston Holmes; Micky Minhas

(57) ABSTRACT

A form of multicast, referred to as "on-demand multicast," provides a methodology that allows for "on demand" multicasting of data. On-demand multicast allows clients to join or leave a transmission at any point. There is no transmission session start or end time—the session is continuously available, although data is not necessarily continuously transmitted. Data blocks missed by late-joining clients are retransmitted per amalgamated client requests through multiple transmission cycles until all clients that have joined the transmission session receive all content. Once a client has received all data blocks comprising the content for the session, the client may exit the ongoing session.

20 Claims, 5 Drawing Sheets

(56) References Cited

U.S. PATENT DOCUMENTS

| | | | |
|---|---|---|---|
| 6,453,438 | B1 | 9/2002 | Miller et al. |
| 6,526,022 | B1 | 2/2003 | Chiu et al. |
| 6,577,599 | B1* | 6/2003 | Gupta et al. ............... 370/236 |
| 6,594,798 | B1 | 7/2003 | Chou et al. |
| 6,693,907 | B1 | 2/2004 | Wesley et al. |
| 6,704,576 | B1* | 3/2004 | Brachman et al. ........... 455/503 |
| 6,718,361 | B1 | 4/2004 | Basani et al. |
| 6,807,578 | B2 | 10/2004 | Satran et al. |
| 6,813,714 | B1 | 11/2004 | Hardjono et al. |
| 6,904,464 | B1 | 6/2005 | Van Langen et al. |
| 6,931,005 | B1 | 8/2005 | Wilhelm |
| 6,973,081 | B1 | 12/2005 | Patel et al. |
| 7,031,326 | B1 | 4/2006 | Shur et al. |
| 7,035,214 | B1 | 4/2006 | Seddigh et al. |
| 7,035,217 | B1 | 4/2006 | Vicisano et al. |
| 7,035,657 | B2 | 4/2006 | Chen et al. |
| 7,107,606 | B2 | 9/2006 | Lee |
| 7,133,371 | B2 | 11/2006 | Helm et al. |
| 7,143,179 | B2 | 11/2006 | Yaport et al. |
| 7,177,917 | B2 | 2/2007 | Giotta |
| 7,184,421 | B1 | 2/2007 | Liu et al. |
| 7,191,332 | B1 | 3/2007 | Pankajakshan et al. |
| 7,206,811 | B2 | 4/2007 | Skurikhin et al. |
| 7,227,843 | B2 | 6/2007 | Belanger et al. |
| 7,355,975 | B2 | 4/2008 | Liu et al. |
| 7,400,601 | B2 | 7/2008 | Moritani et al. |
| 7,882,240 | B2 | 2/2011 | Dickens et al. |
| 7,925,781 | B1* | 4/2011 | Chan et al. .................. 709/238 |
| 8,018,933 | B2 | 9/2011 | Dickens et al. |
| 8,295,286 | B2* | 10/2012 | Rajgopal et al. ......... 370/395.32 |
| 2002/0024956 | A1 | 2/2002 | Keller-Tuberg |
| 2002/0035730 | A1 | 3/2002 | Ollikainen et al. |
| 2002/0129159 | A1 | 9/2002 | Luby et al. |
| 2002/0165920 | A1 | 11/2002 | Keller-Tuberg |
| 2003/0126514 | A1 | 7/2003 | Shabbir Alam et al. |
| 2003/0147390 | A1 | 8/2003 | Rizzo et al. |
| 2003/0206549 | A1 | 11/2003 | Mody et al. |
| 2004/0062267 | A1* | 4/2004 | Minami et al. ............... 370/463 |
| 2004/0132448 | A1* | 7/2004 | Torres et al. ................. 455/427 |
| 2004/0213177 | A1 | 10/2004 | Moritani et al. |
| 2004/0267960 | A1 | 12/2004 | Riedle |
| 2005/0089035 | A1 | 4/2005 | Klements et al. |
| 2005/0160345 | A1 | 7/2005 | Walsh et al. |
| 2005/0216472 | A1 | 9/2005 | Leon et al. |
| 2006/0030312 | A1 | 2/2006 | Han et al. |
| 2006/0050672 | A1 | 3/2006 | Shim et al. |
| 2006/0159090 | A1 | 7/2006 | Chang et al. |
| 2006/0233271 | A1 | 10/2006 | Savas et al. |
| 2006/0239275 | A1 | 10/2006 | Zlateff et al. |
| 2006/0248090 | A1 | 11/2006 | Bennett et al. |
| 2006/0251062 | A1* | 11/2006 | Jain et al. .................... 370/389 |
| 2007/0002858 | A1 | 1/2007 | Bichot et al. |
| 2007/0005804 | A1 | 1/2007 | Rideout |
| 2007/0058626 | A1 | 3/2007 | Keller et al. |
| 2007/0083667 | A1 | 4/2007 | Cooper |
| 2007/0091889 | A1 | 4/2007 | Xiao et al. |
| 2007/0118866 | A1 | 5/2007 | Chen |
| 2007/0147411 | A1 | 6/2007 | Bijwaard et al. |
| 2007/0265968 | A1 | 11/2007 | Kahn et al. |
| 2008/0170550 | A1* | 7/2008 | Liu et al. ..................... 370/338 |
| 2008/0181159 | A1 | 7/2008 | Metzler et al. |
| 2008/0183808 | A1* | 7/2008 | Salesky et al. ............... 709/203 |
| 2009/0003342 | A1 | 1/2009 | Dickens et al. |
| 2009/0006641 | A1* | 1/2009 | Yaqoob et al. ............... 709/231 |
| 2009/0006642 | A1 | 1/2009 | Dickens et al. |
| 2009/0303893 | A1* | 12/2009 | Lee et al. ..................... 370/252 |

OTHER PUBLICATIONS (RFC1301-Multicast Transport Protocol, S. Armstrong, A. Freier, K. Marzullo; Feb. 1992, www.faqs.org/rfcs/rfc1302.html).*

("An End-to-End Reliable Multicast Protocol Using Polling for Scaleability"; Barcellos, Marinho, Ezhilchelvan, Paul; 1998 IEEE).*

Armstrong, S. et al., "RFC1301—Multicast Transport Protocol", Network Working Group Request for Comments: 1301, Feb. 1992; www.faqs.org/rfcs/rfc1301.html, 29 pgs.

Barcellos, Marinho et al., "An End-to-End Reliable Multicast Protocol Using Polling for Scaleability", 1998 IEEE, pp. 1180-1187.

Chiu, et al., "TRAM: A Tree-based Reliable Multicast Protocol", Sun Microsystems Laboratories, of Sun Microsystems, Inc., USA, Jul. 1998, 24 pgs.

Chiu, et al., "Pruning Algorithms for Multicast Flow Control", Sun Microsystems Laboratories, Burlington, MA, Jun. 2000, 10 pgs.

Donahoo, Michael J. et al., "Scalable Multicast Representative Member Selection", 2001 IEEE, pp. 259-268.

Floyd, et al., "A Reliable Multicast Framework for Light-Weight Sessions and Application Level Framing", IEEWAU4 Transactions Networking, Date: Dec. 1997, vol. 5, No. 6, pp. 784-803.

Khanna, et al., "Failure Handling in a Reliable Multicast Protocol for Improving Buffer Utilization and Accommodating Heterogeneous Receivers", PRDC, 10th Pacific Rim International Symposium on Dependable Computing (PRDC'04), 2004, 20 pgs.

Kondratiev, Dmitri, "ARM—Active Reliable Multicast", no date, pp. 3-12.

McKinley, Philip K. et al., "H-RMC: A Hybrid Reliable Multicast Protocol for the Linux Kernel", Date: 1999, Article No. 8, ACM Press, New York, USA, 20 pgs.

Miller, C. Kenneth, "Reliable Multicast Protocol and Applications" Date: Sep. 1998, vol. 1, No. 2, The Internet Protocol Journal, San Jose, CA, 10 pgs.

Royer, Elizabeth et al., "Multicast Operation of the Ad-hoc On-Demand Distance Vector Routing Protocol", Dept. of Electrical and Computer Engineering. University of California. Santa Barbara, Nov. 1999, 12 pgs.

Shim, Hyong Sop et al., "Stateful Multicast Services for Supporting Collaborative Applications", CSE-TR-351-97, Department of EECS, University of Michigan, Nov. 1997, 13 pgs.

Shiroshita, Teruji et al., "Reliable Multicast Transport Protocol (RMTP)", Date: Feb. 7, 1997, Information and Communication Systems Laboratory, NIT, 7 pgs.

Subramaniam, Sandeep et al., "Building a Reliable Multicast Service Based on Composite Protocols", Technical Report, ITTC-F2004-TR-19740-11, Date: Jul. 2003, pp. 1-116, The University of Kansas Center for Research, Inc., 2335 Irving Hill Road, Lawrence, KS 66045-7612, 124 pgs.

Swan, Andrew et al., "Aspen: A Multicast Session Layer", Computer Science Division, University of California, Berkeley, 2004, pp. 1-6.

U.S. Appl. No. 11/823,143, Amendment and Response filed Oct. 21, 2010, 23 pgs.

U.S. Appl. No. 11/823,143, Amendment and Response filed Oct. 7, 2010, 12 pgs.

U.S. Appl. No. 11/823,143, Amendment and Response filed Feb. 11, 2010, 8 pgs.

U.S. Appl. No. 11/823,143, Amendment and Response filed Apr. 19, 2010, 8 pgs.

U.S. Appl. No. 11/823,143, Amendment and Response filed Apr. 6, 2011, 13 pgs.

U.S. Appl. No. 11/823,143, Notice of Allowance mailed Jun. 13, 2011, 7 pgs.

U.S. Appl. No. 11/823,143, Office Action mailed Jan. 7, 2011, 6 pgs.

U.S. Appl. No. 11/823,143, Office Action mailed Jul. 22, 2010, 7 pgs.

U.S. Appl. No. 11/823,143, Office Action mailed Aug. 11, 2009, 8 pgs.

U.S. Appl. No. 11/823,541, Amendment and Response filed Jan. 10, 2011, 27 pgs.

U.S. Appl. No. 11/823,541, Amendment and Response filed Jan. 4, 2012, 14 pgs.

U.S. Appl. No. 11/823,541, Amendment and Response filed Feb. 18, 2010, 14 pgs.

U.S. Appl. No. 11/823,541, Amendment and Response filed Jul. 9, 2012, 15 pgs.

U.S. Appl. No. 11/823,541, Office Action mailed Oct. 4, 2011, 23 pgs.

U.S. Appl. No. 11/823,541, Office Action mailed Mar. 7, 2012, 22 pgs.

U.S. Appl. No. 11/823,541, Office Action mailed Jul. 13, 2009, 17 pgs.

(56) References Cited

OTHER PUBLICATIONS

U.S. Appl. No. 11/823,541, Office Action mailed Sep. 9, 2010, 21 pgs.
U.S. Appl. No. 11/824,280, Amendment and Response filed Nov. 22, 2010, 10 pgs.
U.S. Appl. No. 11/824,280, Amendment and Response filed Apr. 26, 2010, 10 pgs.
U.S. Appl. No. 11/824,280, Office Action mailed Jan. 26, 2010, 10 pgs.
U.S. Appl. No. 11/824,280, Office Action mailed Jul. 23, 2010, 12 pgs.
U.S. Appl. No. 11/824,890, Amendment and Response filed Feb. 5, 2010, 13 pgs.
U.S. Appl. No. 11/824,890, Amendment and Response filed Aug. 20, 2010, 11 pgs.
U.S. Appl. No. 11/824,890, Notice of Allowance mailed Sep. 20, 2010, 8 pgs.
U.S. Appl. No. 11/824,890, Office Action mailed Jun. 1, 2010, 11 pgs.
U.S. Appl. No. 11/824,890, Office Action mailed Aug. 10, 2009, 12 pgs.
Floyd, et al., "A Reliable Multicast Framework for Light-Weight Sessions and Application Level Framing", Retrieved at <<http://conferences.sigcomm.org/sigcomm/1995/papers/floyd.pdf>>, Nov. 1996, pp. 1-24.
Holbrook, et al., "Log-based Receiver-Reliable Multicast for Distributed Interactive Simulation", Retrieved at <<http://cs.ecs.baylor.edu/~donahoo/classes/5321/papers/HSC95.pdf>>, ACM SIGCOMM, Aug. 28-Sep. 1, 1995, pp. 328-341.
Markopoulou, et al., "Hierarchical Reliable Multicast: performance analysis and placement of proxies", Retrieved at <<http://mmnetworks.stanford.edu/papers/markopoulou_ngc00.pdf>>, NGC, Networked Group Communication, Nov. 8-10, 2000, pp. 1-9.
Paul, et al., "Reliable Multicast Transport Protocol (RMTP)", Retrieved at <<http://www.it.iitb.ac.in/~supriya/Seminar/paul97reliable.pdf>>, IEEE Journal on Selected Areas in Communications, vol. 15, No. 3, Apr. 1997, pp. 1-19.
Radoslavov, et al., "A Comparison of Application-Level and Router-Assisted Hierarchical Schemes for Reliable Multicast", Retrieved at <<http://128.9.176.20/divisions/div7/publication_files/comparison_of_application.pdf>>, IEEE/ACM Transactions on Networking, vol. 12, No. 3, Jun. 2004, pp. 10.
Yavatkar, et al., "A Reliable Dissemination Protocol for Interactive Collaborative Applications", Retrieved at <<http://reference.kfupm.edu.sa/content/r/e/a_reliable_dissemination_protocol_for_in_224489.pdf>>, In Proceedings of the ACM Multimedia Conference, Nov. 1995, pp. 12.
Gemmell, Jim., "Scalable Reliable Multicast Using Erasure-Correcting Re-sends", Retrieved at <<http://reference.kfupm.edu.sa/content/s/c/scalable_reliable_multicast_using_erasur_359684.pdf>>, Technical Report, MSR-TR-97-20, Jun. 30, 1997, pp. 1-15.
Kermode, Roger George., "Smart Network Caches: Localized Content and Application Negotiated Recovery Mechanisms for Multicast Media Distribution", Retrieved at <<http://pubs.media.mit.edu/pubs/papers/kermode-phd.pdf>>, Jun. 1998, pp. 1-172.
Metzner, John J., "An Improved Broadcast Retransmission Protocol", Retrieved at <<http://ieeexplore.ieee.org/stamp/stamp.jsp?tp=&arnumber=1096119>>, IEEE Transactions on Communications, vol. 32, No. 6, Jun. 1984, pp. 679-683.
Nonnenmacher, et al., "Reliable multicast: Where to use FEC", Retrieved at <<http://www.eurecom.fr/~btroup/BPublished/FECgain.ps.gz>>, 1996, pp. 1-15.
Nonnenmacher, et al., "Parity-Based Loss Recovery for Reliable Multicast Transmission", Retrieved at <<http://www4.ncsu.edu/~rhee/export/papers/nonnenmacher97paritybased.pdf>>, Technical Report 97-17, Mar. 1997, pp. 1-21.
Rizzo, Luigi., "Effective Erasure Codes for Reliable Computer Communication Protocols", Retrieved at <<http://www.cs.utexas.edu/users/lam/395t/2010%20papers/FEC-rizzo.pdf>>, ACM SIGCOMM Computer Communication Review, vol. 27, No. 2, Apr. 1997, pp. 24-36.
Gemmell, et al., "The PGM Reliable Multicast Protocol", Retrieved at <<http://wmedia.grnet.gr/RMbackground/PGM_IEEE_Network.pdf>>, IEEE Network, vol. 17, No. 1, Jan./Feb. 2003, pp. 1-13.
Gemmell, et al., "Fcast Multicast File Distribution", Retrieved at <<http://reference.kfupm.edu.sa/content/f/c/fcast_multicast_file_distribution_116541.pdf>>, IEEE Network, vol. 14, No. 1, Jan./Feb. 2000, pp. 1-24.
Rizzo, Luigi., "pgmcc: a {TCP}-Friendly Single-Rate Multicast congestion control scheme", Retrieved at <<http://conferences.sigcomm.org/sigcomm/2000/conf/paper/sigcomm2000-1-2.pdf>>, ACM SIGCOMM, Aug. 28-Sep. 1, 2000, pp. 17-28.
Liang, et al., "TCP-SMO: Extending TCP to Support Medium-Scale Multicast Applications", Retrieved at <<http://www-dsg.stanford.edu/sliang/tcpm_infocom.pdf>>, In IEEE Infocom, Jun. 2002, pp. 10.
Jeacle, et al., "TCP-XM: Unicast-enabled Reliable Multicast", Retrieved at <<http://www-test.cl.cam.ac.uk/research/srg/netos/papers/2005-jeacle2005tcpxm.pdf>>, Proceedings 14th International Conference on Computer Communications and Networks, Oct. 17-19, 2005, pp. 6.
Mysore, et al., "FTP-M: An FTP-like Multicast File Transfer Application", Retrieved at <<http://www.google.co.in/url?sa=t&source=web&cd=2&ved=0CB8QFjAB&url=http%3A%2F%2Fcseweb.ucsd.edu%2Fusers%2Fvarghese%2FPAPERS%2Fmanaftp.ps&ei=680qTe7f1826hAfH1ODaDg&usg=AFQjCNGTZIRNO9Qx4PqwpA2a0DPLCxpebQ>>, Technical Report, CS2001-0684, Sep. 11, 2001, pp. 5.
Ghosh, et al., "Congestion Control in Multicast Transport Protocols", Technical Report, WUCS-98-19, Jun. 1998.
Mathis, et al., "The Macroscopic Behavior of the {TCP} Congestion Avoidance Algorithm", Retrieved at <<http://www.cs.tut.fi/~dunaytse/ns2/mathis-tcpmodel-ccr97.pdf>>, ACM SIGCOMM Computer Communication Review, vol. 27, No. 3, Jul. 1997, pp. 1-16.
Montgomery, Todd., "A Loss Tolerant Rate Controller for Reliable Multicast", Retrieved at <<http://www.cs.wvu.edu/~tmont/ltrc-doc.ps.gz>>, Technical Report, NASA—IVV-97-011, Aug. 22, 1997, pp. 1-12.
Padhye, et al., "Modeling TCP Throughput: A Simple Model and its Empirical Validation", Retrieved at <<http://web.univ-pau.fr/~cpham/TCP/Padhye98.pdf>>, May 30, 1998, pp. 1-23.
Visoottiviseth, et al., "M/TCP: The Multicast-extension to Transmission Control Protocol", Proceedings of ICACT, Feb. 2001.
Barcellos, et al., "Efficient TCP-like Multicast Support for Group Communication Systems", Proceedings of the IX Brazilian Symposium on Fault-Tolerant Computing, Mar. 2001.
Widmer, et al., "TCP-Friendly Multicast Congestion Control (TFMCC): Protocol Specification", Retrieved at <<http://tools.ietf.org/html/rfc4654>>, Aug. 2006, pp. 33.
Golestani, et al., "Fundamental Observations on Multicast Congestion Control in the Internet", Retrieved at <<http://www.cs.ust.hk/faculty/bli/660h/golestani99fundamental.pdf>>, Proceedings IEEE Eighteenth Annual Joint Conference of the IEEE Computer and Communications Societies, Mar. 21-25, 1999, pp. 1-23.
Hibler, et al., "Fast, Scalable Disk Imaging with Frisbee", Retrieved at <<http://www.usenix.org/events/usenix03/tech/full_papers/full_papers/hibler/hibler.pdf>>, In Proceedings of the 2003 USENIX Annual Technical Conference, Jun. 2003, pp. 14.
Gemmell, et al., "In Search of an API for Scalable Reliable Multicast", Technical Report, MSR-TR-97-17, Date: Jun. 23, 1997, pp. 1-14.
Tung, Teck-Lee, "Media Board: A Shared Whiteboard Application for the MBone", Computer Science Division (EECS), University of California, Berkeley, Berkeley, CA 94720-1776, pp. 1-38.
Zhang, et al., "Sender-Adaptive and Receiver-Driven Layered Multicast for Scalable Video Over the Internet", IEEE Transactions

(56) References Cited

OTHER PUBLICATIONS on Circuits and Systems for Video Technology, Date: Apr. 2005, vol. 15, No. 4, pp. 482-495.
U.S. Appl. No. 11/823,541, Notice of Allowance mailed Sep. 16, 2013, 13 pgs.
U.S. Appl. No. 11/824,280, Office Action mailed Sep. 3, 2013, 4 pgs.
U.S. Appl. No. 11/823,541, Notice of Allowance mailed Nov. 18, 2013, 3 pgs.
U.S. Appl. No. 11/824,280, Notice of Allowance mailed Nov. 22, 2013, 13 pgs.
U.S. Appl. No. 11/824,280, Amendment and Response filed Oct. 31, 2013, 9 pgs.
U.S. Appl. No. 11/823,541, Amendment and Response filed Jul. 3, 2013, 15 pgs.
U.S. Appl. No. 11/824,280, Amendment and Response filed Jun. 11, 2013, 17 pgs.
U.S. Appl. No. 11/823,541, Office Action mailed Apr. 5, 2013, 22 pgs.
U.S. Appl. No. 11/824,280, Office Action mailed Mar. 11, 2013, 12 pgs.

* cited by examiner

RELIABLE MULTICAST WITH AUTOMATIC SESSION STARTUP AND CLIENT BACKFILL SUPPORT

CROSS-REFERENCES TO RELATED APPLICATIONS

This application is a continuation of and claims priority from U.S. patent application Ser. No. 11/823,143 (now U.S. Pat. No. 8,018,933), titled "Reliable multicast with automatic session startup and client backfill support", filed on Jun. 27, 2007, the entirety of which is hereby incorporated by reference.

BACKGROUND

Multicast implementations in enterprise servers generally fall into two categories: unreliable and reliable. Unreliable implementations, as might be expected given the name, are used in applications where it is okay if content is missed by the receiver. An example of this is a broadcast of a company meeting. If a client device misses a packet, the video/audio may skip a little, but the server should not have to resend the packet—the client's receipt of the one missed packet is not critical. Reliable implementations, by contrast, are used in applications where it is mandatory that the client device receive the entire transmission. An example of this is distribution of a security hot fix or patch. If a client misses a portion of the transmission, the client may have received an incomplete hot fix and thus still be vulnerable to the security flaw.

In the standard implementations of reliable multicast in use today, content is sent in order over the network connection. All clients must connect to the point of transmission and proceed with the download in step with each other. With typical multicast implementation methodologies, there is no mechanism for clients to join an in-progress session late. For example, an administrator who wants to multicast content to 15 client devices creates a session on the server. Fifteen clients join the session before it begins. The administrator then starts the session and data starts transferring. A $16^{th}$ Client Now requests to join the in-progress session but is unable to do so because joining the client after the session starts would mean that the late joining client would miss all of the content sent before it joined. Also, a slow client drags down the performance of the entire session. Since all clients will receive the content at the same time, the content can only be streamed at the rate that the slowest client can still process the data (in order to avoid loss).

SUMMARY

A new form of multicast, herein referred to as "on-demand multicast," provides a methodology that allows for "on demand" multicasting of data. On-demand multicast allows clients to join or leave a transmission at any point. There is no transmission session start or end time—the session is continuously available, although data is not necessarily continuously transmitted. Data blocks missed by late-joining clients are retransmitted per amalgamated client requests through multiple transmission cycles until all clients that have joined the transmission session receive all content. Once a client has received all data blocks comprising the content for the session, the client may exit the ongoing session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

"Multicast" is a term used to describe the delivery of data to a group of destinations, usually from a server computer to multiple client computer devices, simultaneously. The goal of multicast is to use the most efficient strategy to deliver the messages over each link of the network only once, creating copies only when the links to the destinations split. A new, reliable form of multicast, referred to herein as "on-demand multicast," allows client devices to join or leave a transmission at any time. A multicast session is considered "reliable" if the protocol ensures that all client devices in a transmission session receive all of the data. In the on-demand multicast implementation, there is no transmission session start or end time—once an administrator creates a session, the data is available for transfer regardless of when a request for the data is received from a client device. In this sense, the transmission session is constantly "on," even if no data transmitted over the connection at a particular time, e.g., when all prior requests have been completely serviced. And again, client devices can join a transmission session at anytime and the server will ensure that all packets of data are received by each client that joins.

Figure 1:
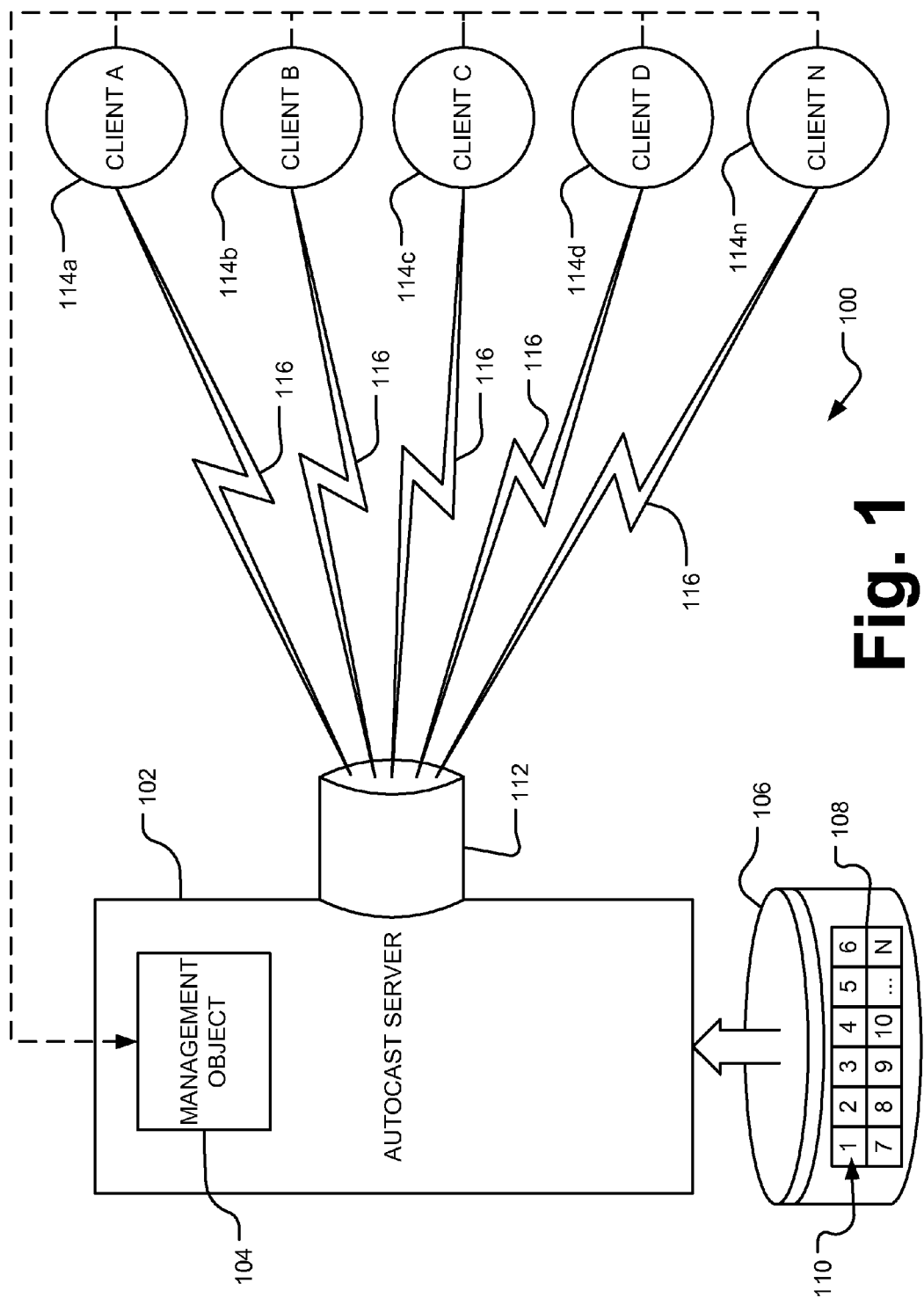
FIG. 1 is a schematic diagram of a multicast computer system providing on-demand session joining for clients.

FIG. 1 depicts an exemplary implementation of an on-demand multicast system 100 that allows client devices to connect with an ongoing data transmission session at any time on demand. The on-demand multicast system 100 includes an on-demand multicast server 102, which maybe understood as a multicast server computer with added functionality. The on-demand multicast server 102 maybe embodied in a standard computer server device, a desktop computer, a notebook or portable computer, a tablet computer, a mainframe computer, or other devices with the ability to broadcast stored data to a plurality of devices connected over a network.

A management object 104 may reside on the on-demand multicast server 102 to provide administrative functions over the data transmission sessions provided by the on-demand multicast server 102. For example, the management object 104, may allow an administrator to select data for distribution and set any additional criteria for managing the distribution. Typically in an on-demand multicast scenario, minimal if any distribution criteria will be put in place as a transmission session should be initiated upon any request of a client device at any time and continue until the client requests are completed. However, it may be desirable in some circumstances, for example, to preserve network bandwidth during high-traffic periods, e.g., during the work day, to limit the timeframe available for on-demand multicast sessions, e.g., to occur overnight only. Note that while the management object 104 is shown installed on the on-demand multicast server 102, the management object 104 maybe controlled remotely via a network connection with the on-demand multicast server 102.

A content provider application 106 may be used in conjunction with the on-demand multicast server 102 to directly manage the selection and transfer of data 108 for transmission by the on-demand multicast server 102. The content provider 106 may manage a content store for the data 108 that is separate from, but connected with the on-demand multicast server 102. Alternatively, the data 108 may reside on the on-demand multicast server 102 and the content provider 106 may be understood as a plug-in application to the operating system of the on-demand multicast server 102 to specifically manage the data 108 for on-demand multicast transmission. As shown in FIG. 1, the data maybe divided into numbered subsets or data blocks 110. The data blocks 110 may be discrete data packets or groups of data packets. The division of the data 108 into data blocks 110 assists in the ability of the on-demand multicast server 102 to provide an on-demand multicast transmission session. As will be described in greater detail below, client devices requesting data in a particular transmission session are advised of the number of the data blocks in a particular transmission session by the content provider 106 and are charged with the responsibility of monitoring which of the data blocks 110 have already been received and which of the data blocks 110 still need to be received.

As with traditional multicast data transmissions, the on-demand multicast server 102 may conduct a transmission session through a network link 112 that maybe connected to a plurality of client devices 114a-114n. Each of the client devices 114a-114n establishes a network connection 116 with the on-demand multicast server 102 through the network link 112. The network connection 116 can be part of a local area network, either wired (e.g., Ethernet) or wireless, or a wide area network, e.g., a public network such as the Internet. Each of the client devices 114a-114n maybe any type of computer device capable of establishing a network connection 116, for example, a personal computer, a notebook computer, another server, a table PC, a workstation, a mainframe computer, an internet appliance, a handheld PC, a mobile telephone or other wireless communication device, a personal digital assistant, a set-top box, a video gaming consul, or other similar computing devices.

In an on-demand multicast implementation, each of the client devices 114a-114n may establish a network connection 116 at any time to join a data transmission session. The first client device that submits a request to the on-demand multicast server 102, a transmission session of data content configured by an administrator may be immediately initiated. Any subsequent client device making a transmission request will simply join the transmission session already in progress. As part of the join processes, the management object 104 may provide authorization to client devices 114a-114n to join a transmission session. In some implementations, authorization approval function may reside with the content provider 106. The content provider may further indicate to a requesting client device the number of data blocks 110 in the data set 108 being transmitted in the particular transmission session. Knowledge of the number of data blocks 110 in a data set 108 allows a client device 114a-114n to determine when it received all of the data 108 and can exist the transmission session.

For example, presume that Client A 114a is the first to make a request to the on-demand multicast server 102 for a particular data set 108. By using the management object 104 the administrator has configured the particular data set managed by the corresponding the content provider 106 for on-demand multicast transmission. The content provider 106 replies to the request of Client A 114a with an authorization number N of data blocks 110 in the data set 108 to be transmitted. Client A 114a then sends authorization over the network 116 to the on-demand multicast server 102 which, upon confirmation of the authorization by the content provider 106, begins the transmission session with the first data block 110 of data set 108.

Next, presume that at some later time Client B 114b sends a request over the network 116 to on-demand multicast server 102 for transmission of the data set 108. Instead of denying Client B 114b access to the transmission session for failure to make a request before the initiation of the transmission session, the content provider 106 provides authorization for the Client B 114b to join the transmission session and further provides the number N of data blocks 110 in the data set 108. Client B 114b then sends its authorization over the network 116 and joins the transmission session already in progress. Presume that at the time Client B joins the transmission session the on-demand multicast server 102 is about to transmit the fourth of the data blocks 110. Client B 114b will then receive the fourth of data blocks 110 and additional ones of the data blocks 110 transmitted thereafter.

Note, however, that the transfer of the data blocks 110 is usually not sequential. The protocol of the on-demand multicast server 102 polls the client devices 114a-114n to determine which of the data blocks 110 are still needed. At the beginning of a transmission session, any client device 114a-114n joined at the time will likely request all N data blocks 110 in the data set 108. Thus, an initial transmission of the data blocks 110 may be sequential. However, it need not be if for some reason the initiating client device requests less than the total number of data blocks in the data set 108. Once the initial set of data blocks 110 has been transmitted, the requests for data blocks from client devices will likely be different depending upon the time the client device joined the transmission session and each request will likely be for some number of data blocks 110 less than N.

For example, consider a scenario with respect to FIG. 1 in which Client C 114c joins the transmission session previously described, but does not join until the transmission of the ninth of the data blocks 110. Also assume that Client A 114a experienced interference on the network 116 while receiving the data blocks 2 and therefore has requested receipt of data block 2 again in response to the poll from the on-demand multicast server 102. In this scenario, all three joined client devices need data block 2, two client devices (Client B 114b and Client C 144c) need data blocks 1 and 3, one client device (Client C 114c) additionally needs the data blocks 4-8, and none of the client devices 114a, 114b, 114c need transmission of the data blocks 9-12. Thus, it would be a waste of processing resources and network bandwidth for the on-demand multicast server 102 to transmit data blocks 9-12 again.

The logic of the on-demand multicast application may employ a sorting or weighting scheme to determine a prioritization order for transmitting additional data blocks in further transmission cycles. Such schemes may be employed to meet certain transmission guidelines or goals, e.g., maximization of bandwidth efficiency or compliance with a requirement set by an administrator. For example, priority may be placed upon transmission of data requested by the most number of client devices before sending data requested by a lesser number of client devices. In this example in the context of the scenario described above, data block 2 may be transmitted first after which Client A 114a may exit the transmission session. Next, the data block 1 followed by the data block 3 may be transmitted, as two client devices still need this information. After receipt of data blocks 1 and 3, Client B 114b may exit the transmission session. Finally, data blocks 4-8 may be transmitted for the benefit of Client C 114c, upon receipt of which Client C 114c may exist the transmission session.

The on-demand multicast server 102 may then poll for additional requests for data blocks. If no further requests are received from any of the client devices 114a-114n, then the on-demand multicast session on the on-demand multicast server 102 will remain dormant until a new request is received. As should be apparent from the above discussion, an on-demand multicast session could continue indefinitely as new client devices join the transmission session once it is initiated. Further, depending upon the sorting or weighting scheme employed by the on-demand multicast server 102 to select packets for delivery, once the initial series of data blocks are sent, additional requested data blocks maybe sent in any order. If a client device 114a-114n has already received a packet or block transmitted, the client device 114a-114n may remain joined in the transmission session until the last needed packet is received.

Figure 2:
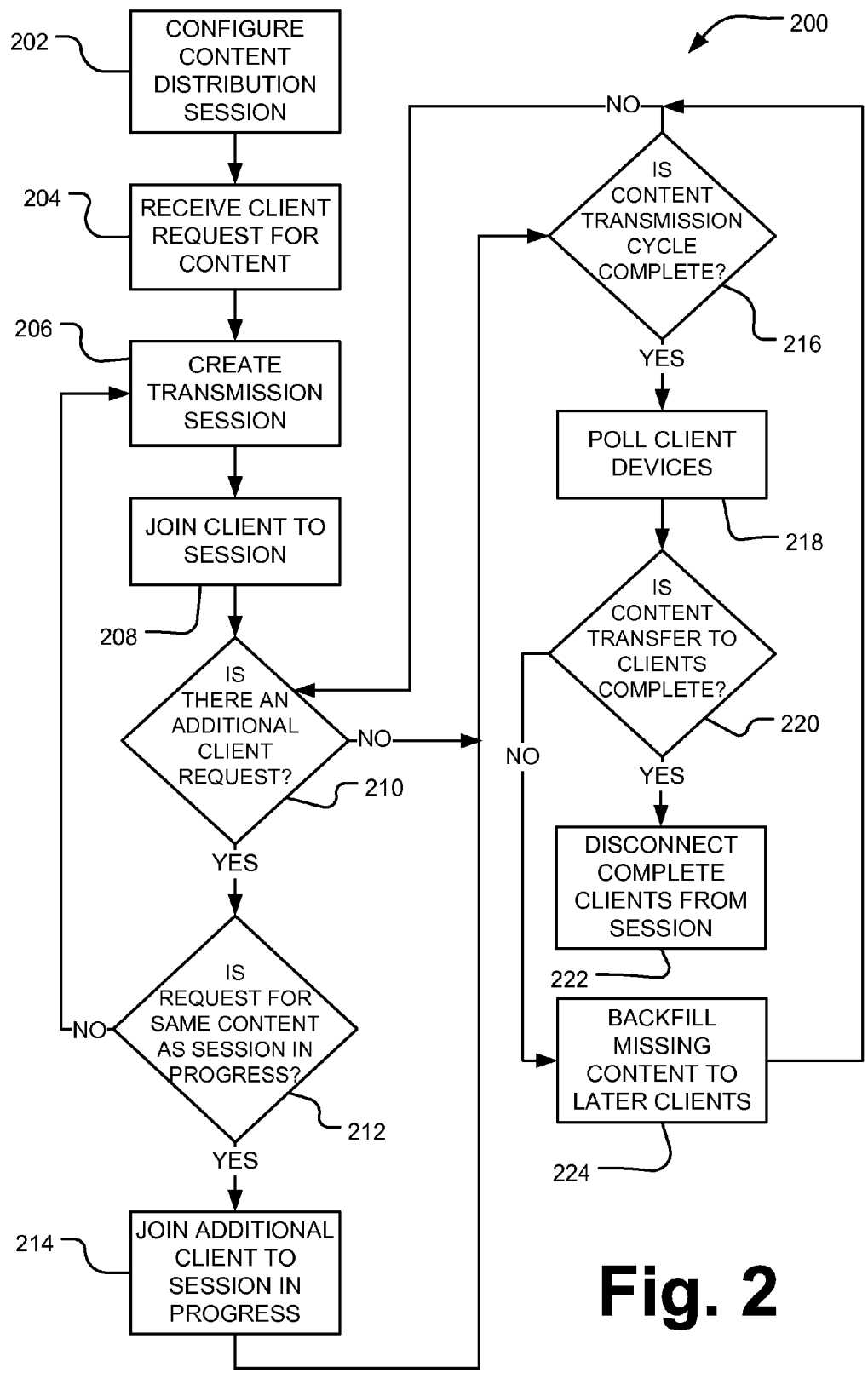
FIG. 2 is a flow diagram depicting an implementation of a process for on-demand multicast of data from a server to client devices on demand.

In order to implement an on-demand multicast session, a client application is installed on a workstation or remote client computer and an on-demand multicast server component and content provider are installed onto a server computer to provide the on-demand multicast protocol. The management object is also installed on a workstation, remote computer, or the on-demand multicast server computer. An on-demand multicast transmission session may now be conducted. An exemplary on-demand multicast transmission session process 200 as performed by the on-demand multicast server is depicted in FIG. 2.

Using the management tools, an "on demand" session for content distribution is created as shown in configuration operation 202. As part of the configuration operation 202, the content to be transferred is selected. The content provider is configured to access the content and pass it to the on-demand multicast server. The on-demand multicast server is also configured to allow clients to request the content and the parameters to use when sending it. The on-demand multicast server may further notify client devices of the creation of the content distribution session and provide any necessary authorization information for joining. A client application requests transmission of the content by connecting to the on-demand multicast server and asking for the content. The request may be made using an agreed upon name or authorization as previously configured by the administrator.

When the on-demand multicast server receives a client request in receiving operation 204, the on-demand multicast server determines the session parameters for content transfer as previously configured by the administrator and determines the content is to be delivered via "on demand" multicast. As this is the first request for the content (meaning that an in-progress transmission for this content does not already exist), a transmission session is created in creation operation 206.

The on-demand multicast server then joins the client to the transmission in joining operation 208 and begins transmitting content.

The on-demand multicast server continuously monitors the network link to identify any additional client requests to join the session in a first query operation 210. At a later point, a second client device running the on-demand multicast client application contacts the multicast server requesting the same content as the first client. The multicast server may also determine whether there is an in-progress transmission for this content occurring for the first client in a second query operation 212. The multicast server may further determine the session parameters for content transfer and determine that the content is to be delivered "on demand" via on-demand multicast. If the content requested by the second client is the same as the content in the transmission session for the first client, the on-demand multicast server allows the second client application to join the pre-existing transmission session in joining operation 214. The second client thus starts receiving content mid-stream. Note, if the content requested by the second client is determined in the second query operation 212 to not be the same content as requested by the first client in the present transmission session, the process 200 returns to the creation operation 206 to create a new transmission session for the different content.

Returning to the first query operation 210, if the on-demand multicast server detects no additional client requests, the process 200 may undertake a third query operation 216 to determine whether the present transmission cycle (i.e., the transmission of a determined number or set of data blocks) is complete. The third query operation 216 may similarly be conducted after joining operation 214. If the transmission cycle is not complete, then the on-demand multicast process 200 may return to the first query operation 210 to monitor the network link for additional client requests 210. Note that these monitoring functions are performed by the on-demand multicast server while the transmission of data to client devices is performed continuously.

Alternately, if the transmission cycle of the third query operation 216 is complete, then the on-demand multicast server may poll the joined clients to determine whether additional data blocks need to be transmitted in polling operation 218. Responses from the joined client devices are analyzed in a fourth query operation 220 to determine whether content transfer to any of the clients is complete. If so, then those client devices that have received all N of the data blocks corresponding to the content of the transmission session will be disconnected and can exit the session in disconnecting operation 222. Alternately, if any of the client devices still need any of the data blocks, the on-demand multicast process 200 will continue with a further transmission cycle to backfill any missing content to clients still joined to the transmission session in backfilling operation 224. An exemplary backfilling operation is described in greater detail below with respect to FIG. 3. During each successive backfilling transmission cycle of the transmission session the on-demand multicast process 200 continues by monitoring for additional client requests beginning at the first query operation 210 and continuing until all clients are disconnected in disconnecting operation 222.

Figure 3:
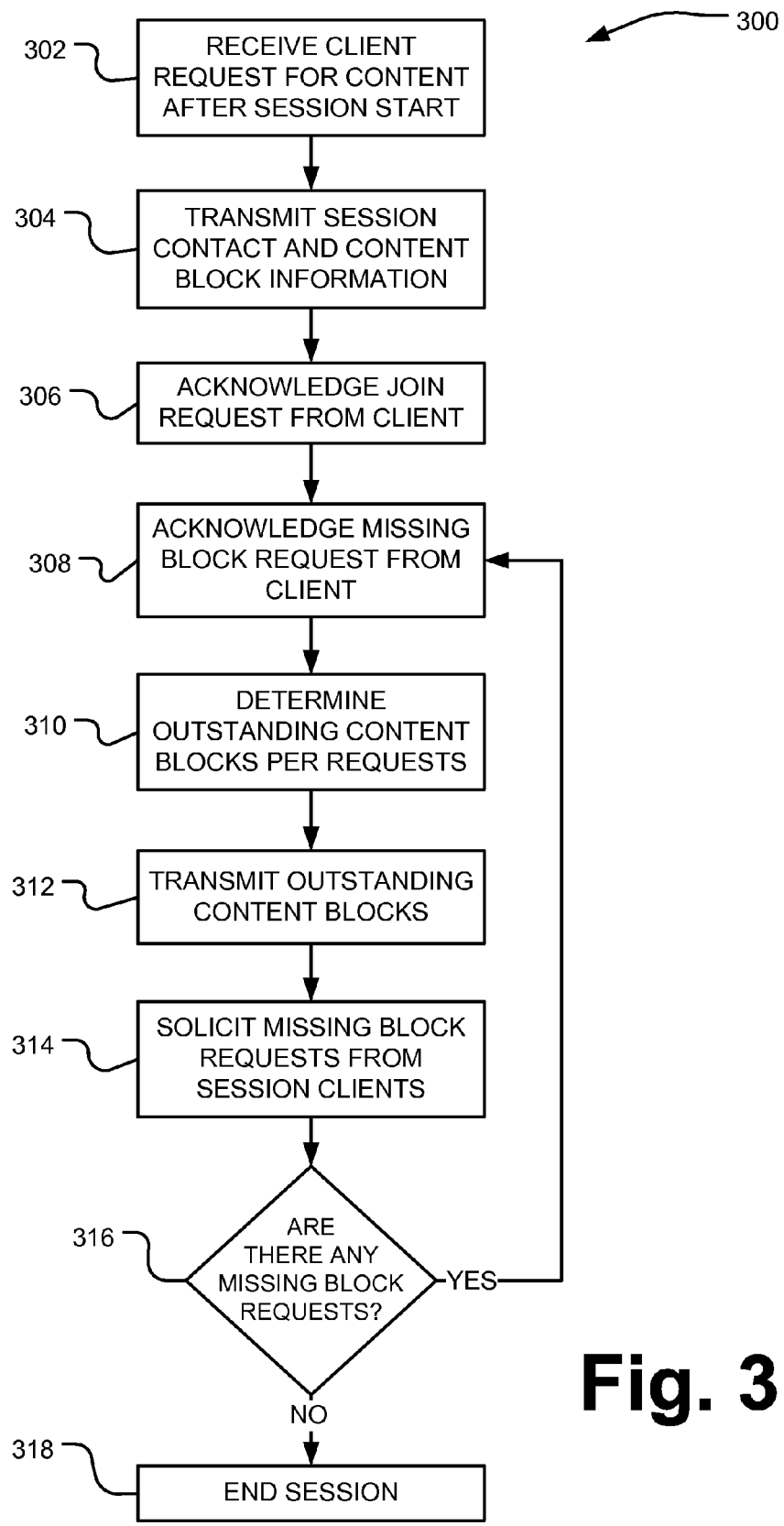
FIG. 3 is a flow diagram depicting an implementation of a backfill process for providing reliable data transfer to client devices joining an on-demand multicast session after start of transmission.

As indicated above, FIG. 3 depicts an exemplary implementation of an "on demand" client join and backfill process 300 to provide on-demand multicast utilizing a particular transmission protocol. In a receiving operation 302, the on-demand multicast server receives notification from a client device that it desires content. An on-demand multicast session service then transmits instructions in transmitting operation 304 to the requesting client advising how to contact the appropriate content transfer server and identifying the number of data blocks, N, that make up the content. The on-demand multicast server then receives a join request from the client, which the on-demand multicast server then acknowledges in acknowledging operation 306 and allows joinder. The on-demand multicast server then receives a request from the client for the blocks it is missing (blocks 1 through N if the client is the initial joiner) from the session content and acknowledges receipt of the request in acknowledging operation 308.

Consider a late joiner. The client may begin by requesting blocks 1-N from the on-demand multicast server. The on-demand multicast server may not back up and retransmit the first data block, but will merge the request for blocks 1-N with its current request queue. The exemplary transmission protocol may also now allow the client to request data blocks that remain in advance of the trailing edge of its flow control window. Furthermore, according to the exemplary transmission protocol, the clients may not ask for packets before the lowest packet number first transmitted to them. These steps prevent late joiners from endlessly stalling the session at the start of the file.

The on-demand multicast server considers all outstanding requests for data blocks, creates an amalgam of the requested data blocks, and determines an order in which to transmit the requested data blocks in determining operation 310. The on-demand multicast server then transmits the requested outstanding data blocks in the determined order in transmitting operation 312. The client device receives data blocks using the transmission protocol and writes them to disk. Most lost packets are recovered using the transmission protocol, but some may remain lost. When the on-demand multicast server finishes sending all requested data blocks, it then sends a solicitation via the transmission protocol for new block requests to the joined clients in solicitation operation 314. The backfill process 300 determines whether additional block requests (e.g., due to un-recovered packet loss or late joining) are received as indicated in query operation 316. If there are additional block requests, the transmission protocol returns the backfill process 300 to acknowledgement operation 308 to cycle again. If no additional block requests or new join requests are received, the backfill process 300 ends the transmission session 318.

Figure 4:
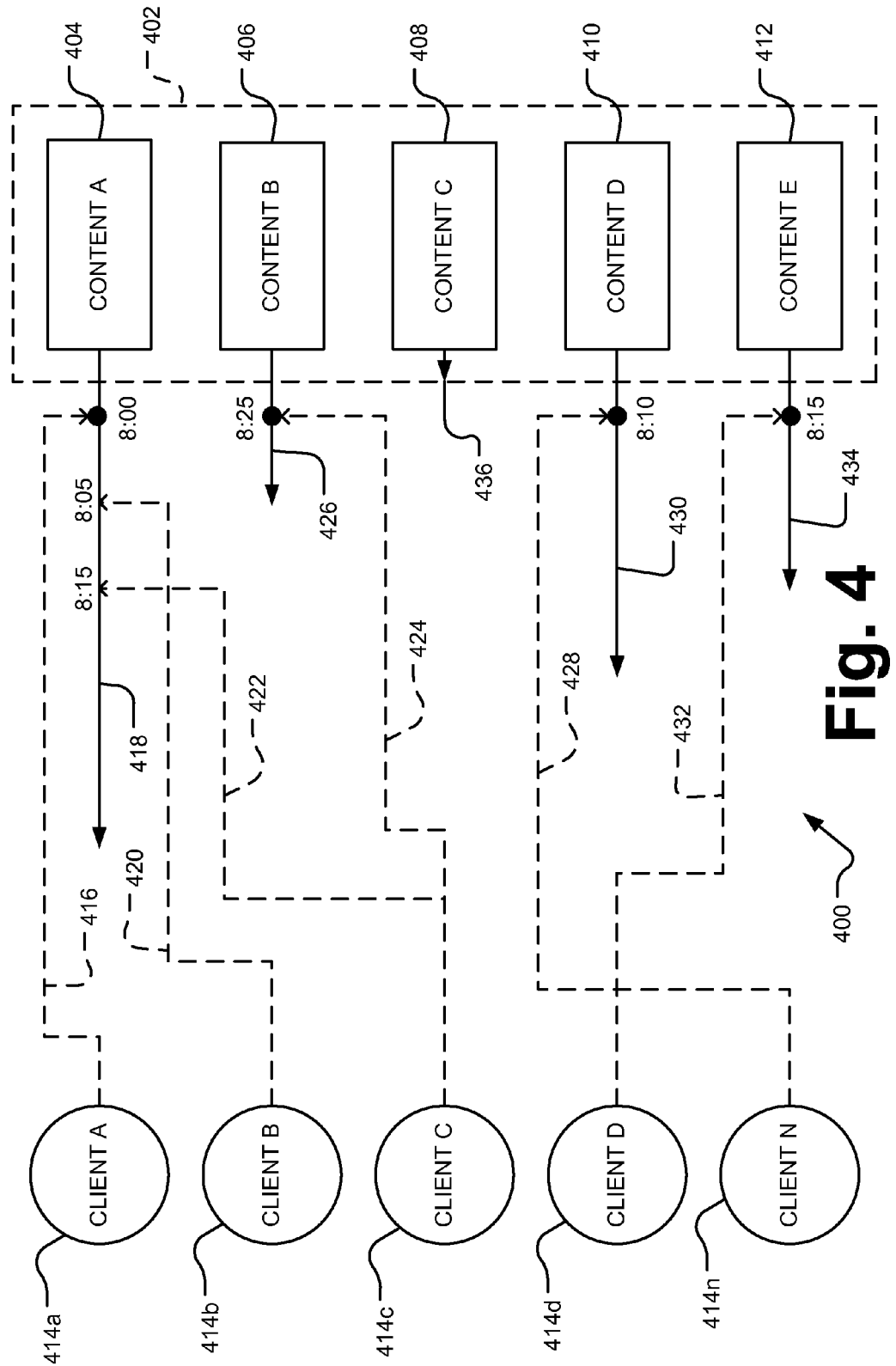
FIG. 4 is a schematic diagram depicting exemplary on-demand multicast transmission sessions of multiple content packages to multiple client devices.

As suggested in FIG. 2, the on-demand multicast server may provider the opportunity for clients to join multiple transmission sessions simultaneously. As shown in FIG. 4, an administrator may configure multiple distribution sessions for transmission by the on-demand multicast server 402. In the example of FIG. 4, five different content packages labeled Content A 404, Content B 406, Content C 408, Content D 410, and Content E 412 are all available for transmission requests by various client devices 414a-414n. In exemplary implementation of FIG. 4 Client A 414a has initially made a request 416 for transmission of Content A 404 and a transmission session 418 for Content A was initiated at 8:00.

As further shown, Client B 414b has also joined the Content A transmission session 418 as indicated by the request 420 showing a join time of 8:05. Client C 414c also initiated a request 422 to join the Content A transmission session 418b, which occurred at 8:15. Therefore, as indicated, Client B 414b and Client C 414c were allowed to join the Content A transmission session 418 while it was already in progress. Additional clients can continue to join the Content A transmission session 418, which will continue until the on-demand multicast server 402 no longer receives a request for data blocks in response to its poll.

In addition to the Content A transmission session 418, Client C 414c has requested distribution of Content B 406 as indicated by its request 424. The Content B transmission session 426 is depicted as starting at 8:25 after receipt of the transmission request 424 from Client C 414c. At this time no other client devices have requested to join the Content B transmission session 426. As further depicted in FIG. 4, Client D 414d has initiated a request 432 for Content E 412 from the on-demand multicast server 402. A Content E transmission session 434 was initiated at 8:15 and proceeds simultaneously with the other transmission sessions. Similarly, client N 414n transmitted a request 428 to the on-demand multicast server 402 for distribution of Content D 410. The on-demand multicast server instantiated a Content D transmission session 430 in response at 8:10.

Note that no request has been made for a transmission session for Content C 408. However, if Content C were configured by the administrator to be available as on-demand multicast, then a transmission session would be initiated upon receipt of a request from any of the client devices 414a-414n.

Note too that, with respect to the Content A transmission session 418, neither the request 420 of Client B 414b or the request 422 of Client C 414c was denied merely for being received after the start of the Content A transmission session 418. Both Client B 414b and Client C 414c were allowed to join the Content A transmission session 418, which will continue to transmit needed data blocks until all of the requests of any joined clients have been met.

In comparison, in traditional scheduled multicast systems, any client wishing to join after the initiation of a transmission session normally be denied outright, which would be the fate of Client C 414c if, for example, the transmission session were scheduled to begin before 8:15. In an alternative multicast scenario, a new transmission session may be initiated to transmit the same content but within a different data stream. It should be apparent, however, that this latter multicast option to create a new transmission session of the same content can create a significant drain on available bandwidth of the network.

Further, if, for example, a multicast configuration for a transmission session of Content A was not scheduled to begin until 8:15, although the requests of Client A 414a and Client B 414b were earlier, they would have to wait until 8:15 for transmission to begin. In contrast, in the on-demand multicast system 400 none of the clients 414a-414n has to wait to receive data as would be the case in a scheduled multicast configuration. With the on-demand multicast system 400, data transmission is immediate and on demand.

In first embodiments, a method on a computer server for multicasting data to a number of client devices may comprise: (a) receiving a number of requests from one or more requesting client devices for respective blocks of a set of data, (b) if there is no current transmission session corresponding to the requests, then creating a transmission session of the blocks of the data set, joining the requesting client devices to the transmission session, and transmitting the blocks to the requesting client devices, (c) if there is a current transmission session corresponding to the requests, allowing additional requesting client devices to join the transmission session, and (d) continuing the transmission session until all requests from any joined client devices are satisfied.

In second embodiments, the method of the first embodiments may further comprise: configuring parameters for the transmission session of the data set; determining, based upon the parameters, whether and how the client devices can join the transmission session; and transmitting authorizations to the requesting client devices allowing the requesting client devices to join the transmission session.

In third embodiments, the method of the first embodiments may further comprise transmitting a value to the requesting client devices indicating a number of the blocks in the data set.

In fourth embodiments, the method of the third embodiments may further comprise polling the joined client devices at the end of a transmission cycle to determine whether all requests have been satisfied; and receiving updated requests from the joined client devices indicating which of the number of blocks the joined client devices did not receive, wherein the transmitting operation continues the transmission session by transmitting the blocks not previously received in a further transmission cycle.

In fifth embodiments, the transmission cycle of the fourth embodiments may end upon completion of transmission of blocks of the data set corresponding to an initial request or any updated requests.

In sixth embodiments, the method of the fourth embodiments may further comprise amalgamating the updated requests to determine which of the number of blocks to transmit in the further transmission cycle.

In seventh embodiments, the transmitting operation of the fourth embodiments may transmit the blocks not previously received according to a prioritization scheme for determining a transmission order for the blocks in the further transmission cycle.

In eighth embodiments, the transmitting operation of the first embodiments may transmit the blocks of the data set in a non-sequential order.

In ninth embodiments, the method of the first embodiments may further comprise receiving a request from one or more of the client devices for blocks of a second set of data; and creating a second transmission session of the blocks of the second data set according to the operations of the first embodiments.

In tenth embodiments, a computer readable medium may have computer executable instructions for performing a computer process implementing a multicasting session on a computer server, the process instructions comprising causing the computer server to (a) acknowledge a number of requests from one or more requesting client devices for respective blocks of a set of data, (b) if there is no current transmission session corresponding to the requests, create a transmission session of the blocks of the data set, join the requesting client devices to the transmission session, and transmit the blocks to the requesting client devices, (c) if there is a current transmission session corresponding to the requests, join additional requesting client devices to the transmission session, and (d) continue the transmission session until all requests from any joined client devices are satisfied.

In eleventh embodiments, the computer readable medium of the tenth embodiments may further comprise instructions for causing the computer server to configure parameters for the transmission session of the data set; determine, based upon the parameters, whether and how the client devices can join the transmission session; and transmit authorizations to the requesting client devices allowing the requesting client devices to join the transmission session.

In twelfth embodiments, the computer readable medium of the tenth embodiments may further comprise instructions for causing the computer server to transmit a value to the requesting client devices indicating a number of the blocks in the data set.

In thirteenth embodiments, the computer readable medium of the twelfth embodiments may further comprise instructions for causing the computer server to poll the joined client devices at the end of a transmission cycle to determine whether all requests have been satisfied; acknowledge updated requests from the joined client devices indicating which of the number of blocks the joined client devices did not receive; and continue the transmission session by transmitting the blocks not previously received in a further transmission cycle.

In fourteenth embodiments, the computer readable medium of the thirteenth embodiments may further comprise instructions for causing the computer server to end each transmission cycle upon completion of transmission of blocks of the data set corresponding to an initial request or any updated requests.

In fifteenth embodiments, the computer readable medium of the thirteenth embodiments may further comprise instructions for causing the computer server to amalgamate the updated requests to determine which of the number of blocks to transmit in the further transmission cycle.

In sixteenth embodiments, the computer readable medium of the thirteenth embodiments may further comprise instructions for causing the computer server to transmit the blocks not previously received according to a prioritization scheme for determining a transmission order for the blocks in the further transmission cycle.

In seventeenth embodiments, the computer readable medium of the tenth embodiments may further comprise instructions for causing the computer server to transmit the blocks of the data set in a non-sequential order.

In eighteenth embodiments, a method on a client computer device for receiving multicast data may comprise sending a request to an on-demand multicast server to receive a set of data; receiving an authorization to join a transmission session transmitting the data set; receiving a value indicating a number of blocks in the data set; sending a request to join the transmission session; receiving one or more of the blocks in a transmission cycle; and responding to a poll by requesting a subset of the blocks not received in the transmission cycle.

In nineteenth embodiments, the method of the eighteenth embodiments may further comprise exiting the transmission session upon receipt of all subsets of the data set.

In twentieth embodiments, computer readable medium may have computer executable instructions for performing a computer process according to the method of the eighteenth embodiments.

Figure 5:
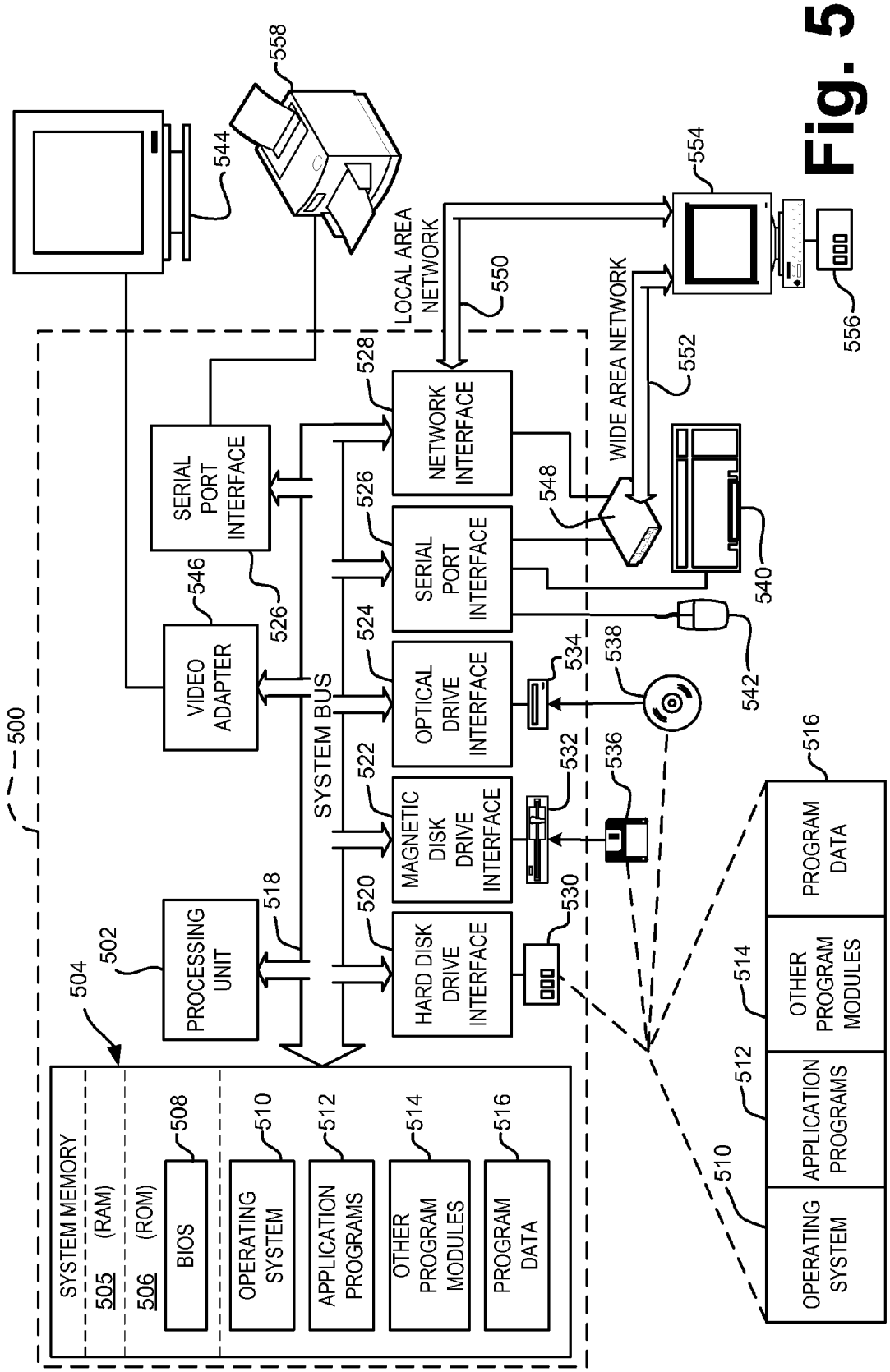
FIG. 5 is a schematic diagram of a general purpose computing device that may be implemented as an on-demand multicast server or a client device.

An exemplary general purpose computing device that may be in the form of the on-demand multicast server or a client device is depicted in FIG. 5. The general purpose computer 500 includes a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. In an exemplary implementation, the management object tools and on-demand multicast transmission protocols, may be incorporated as part of the operating system 510, application programs 512, or other program modules 514.

A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB).

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, e.g., Ethernet or other communications interfaces. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for multicasting data to a number of client devices comprising:

establishing an on-demand multicast session that is continuously available to client devices and allows client devices to join or leave the on-demand multicast session at any time;

polling, at an end of a transmission cycle, client devices that have joined the on-demand multicast session to determine whether all requests for data blocks have been satisfied;

receiving updated requests from the joined client devices indicating data blocks that have not been received by the joined client devices; and transmitting, in another transmission cycle, data blocks that the joined client devices have not previously received, wherein after all outstanding requests have been satisfied, the on-demand multicast session remains available until a new request is received from another client device.

2. The method of claim 1 further comprising:
configuring parameters for the on-demand multicast session;
determining, based upon the parameters, whether and how client devices can join the on-demand multicast session; and
transmitting authorizations to the requesting client devices allowing the requesting client devices to join the on-demand multicast session.

3. The method of claim 1 further comprising:
amalgamating the updated requests to determine which of the data blocks to transmit in a further transmission cycle.

4. The method of claim 1, wherein blocks not previously received by the joined client devices are transmitted according to a prioritization scheme for determining a transmission order for data blocks in a further transmission cycle.

5. The method of claim 1, wherein data blocks are transmitted in a non-sequential order.

6. The method of claim 1 further comprising:
receiving a request from one or more of the client devices for blocks of a second set of data; and
creating a second on-demand multicast session of the blocks of the second data set.

7. A computer readable storage device having stored thereon computer-executable instructions for performing a computer process implementing a multicasting session on a computer server, the execution of the instructions causing the computer server to perform operations comprising:
establishing an on-demand multicast session that is continuously available to client devices and allows client devices to join or leave the on-demand multicast session at any time;
polling, at an end of a transmission cycle, client devices that have joined the on-demand multicast session to determine whether all requests have been satisfied;
receiving updated requests from the joined client devices indicating data blocks that have not been received by the joined client devices; and
transmitting, in a further transmission cycle, data blocks not previously received by the joined client devices,
wherein after all outstanding requests have been satisfied, the on-demand multicast session remains available until a new request is received from another client device.

8. The computer readable storage device of claim 7 further comprising instructions for causing the computer server to:
configuring parameters for the on-demand multicast session;
determining, based upon the parameters, whether and how client devices can join the on-demand multicast session; and
transmit authorizations to requesting client devices allowing the requesting client devices to join the on-demand multicast session.

9. The computer readable storage device of claim 7 further comprising instructions for causing the computer server to:
transmit a value to requesting client devices indicating a number of the data blocks in a data set.

10. The computer readable storage device of claim 7 further comprising instructions for causing the computer server to:
end each transmission cycle upon completion of transmission of data blocks of a data set corresponding to an initial request or any updated requests.

11. The computer readable storage device of claim 7 further comprising instructions for causing the computer server to:
amalgamate the updated requests to determine which data blocks to transmit in the further transmission cycle.

12. The computer readable storage device of claim 7 further comprising instructions for causing the computer server to:
transmit data blocks not previously received according to a prioritization scheme for determining a transmission order for the data blocks in the further transmission cycle.

13. The computer readable storage device of claim 7 further comprising instructions for causing the computer server to:
transmit the data blocks of a data set in a non-sequential order.

14. A computing device comprising:
a processor; and
a storage storing computer-executable instructions which, when executed by the computing device, cause the computing device to perform a sequence of operations, the operations comprising:
establishing an on-demand multicast session that is continuously available to client devices and allows client devices to join or leave the on-demand multicast session at any time;
polling, at an end of a transmission cycle, client devices that have joined the on-demand multicast session to determine whether all requests have been satisfied;
receiving at least a first updated request from the joined client devices indicating data blocks that the joined client devices have not received; and
transmitting, in a further transmission cycle, data blocks not previously received by the joined client devices,
wherein after all outstanding requests have been satisfied, the on-demand multicast session remains dormant and available until a new request is received from another client device.

15. The computing device of claim 14, the operations further comprising:
amalgamating the at least a first updated request to determine which data blocks to transmit in the further transmission cycle, the at least a first updated request comprising a plurality of updated requests.

16. The computing device of claim 14, the operations further comprising:
employing at least one of a sorting scheme or a weighting scheme to determine a prioritization order for transmitting the data blocks not previously received in the further transmission cycle,
the transmitting the data blocks not previously received in the further transmission cycle transmits the data blocks not previously received in a non-sequential order.

17. The method of claim 1 further comprising:
ending each transmission cycle upon completion of transmission of data blocks of a data set corresponding to an initial request or any updated requests.

18. The method of claim 1, wherein the transmitting operation continues the on-demand multicast session by transmitting the data blocks not previously received in a further transmission cycle.

19. The method of claim 4, further comprising:
employing at least one of a sorting scheme or a weighting scheme to determine a prioritization order for transmitting the data blocks not previously received in the further transmission cycle.

20. The computer readable storage device of claim 12 further comprising instructions to:

employ at least one of a sorting scheme or a weighting scheme to determine a prioritization order for transmitting the data blocks not previously received in the further transmission cycle.

\* \* \* \* \*